(12) United States Patent
Largman et al.

(10) Patent No.: US 10,397,624 B1
(45) Date of Patent: Aug. 27, 2019

(54) DYNAMIC OBJECT UPDATE SUBSCRIPTIONS BASED ON USER INTERACTIONS WITH AN INTERFACE

(71) Applicant: Slack Technologies, Inc., San Francisco, CA (US)

(72) Inventors: Raissa Largman, San Francisco, CA (US); Jason Klym, San Francisco, CA (US); Danil Glinenko, Vancouver (CA); Neil Walker, Kings Beach, CA (US); Mark Christian, Oakland, CA (US); Serguei Mourachov, Vancouver (CA)

(73) Assignee: SLACK TECHNOLOGIES, INC., San Francisco, CA (US)

(*) Notice: Subject to any disclaimer, the term of this patent is extended or adjusted under 35 U.S.C. 154(b) by 0 days.

(21) Appl. No.: 16/206,553

(22) Filed: Nov. 30, 2018

Related U.S. Application Data

(63) Continuation of application No. 16/176,851, filed on Oct. 31, 2018.

(60) Provisional application No. 62/729,180, filed on Sep. 10, 2018.

(51) Int. Cl.
*H04N 21/45* (2011.01)
*H04N 21/422* (2011.01)
*H04N 21/472* (2011.01)
*H04N 21/2543* (2011.01)

(52) U.S. Cl.
CPC ... *H04N 21/2543* (2013.01); *H04N 21/42204* (2013.01); *H04N 21/4516* (2013.01); *H04N 21/472* (2013.01)

(58) Field of Classification Search
CPC ......... H04N 21/2543; H04N 21/42204; H04N 21/4516; H04N 21/472
See application file for complete search history.

(56) References Cited

U.S. PATENT DOCUMENTS

| | | | |
|---|---|---|---|
| 6,718,361 B1 | 4/2004 | Basani et al. | |
| 6,789,257 B1* | 9/2004 | MacPhail | G06F 11/0709 709/223 |
| 8,620,385 B2 | 12/2013 | Counts et al. | |
| 2002/0187775 A1* | 12/2002 | Corrigan | H04L 12/14 455/414.1 |
| 2008/0155112 A1* | 6/2008 | Ma | H04L 12/1859 709/231 |
| 2008/0184266 A1* | 7/2008 | Bornhoevd | G06F 9/542 719/318 |
| 2017/0104799 A1* | 4/2017 | Prock | H04W 12/06 |

(Continued)

*Primary Examiner* — Sumaiya A Chowdhury
(74) *Attorney, Agent, or Firm* — Alston & Bird LLP

(57) ABSTRACT

Subscriptions for object updates to be transmitted to a client device may be dynamically managed based on the occurrence of one or more trigger events at the client device, which causes the client device to transmit subscription modification requests to a computing platform configured to dynamically maintain object subscription lists for each of one or more client devices based at least in part on subscription modification requests received from each of the one or more client devices, to determine whether subscribed objects for a particular client device are current at the client device, and to transmit updates of subscribed objects in real-time upon determining that the particular client device does not comprise current object data.

29 Claims, 6 Drawing Sheets

(56) References Cited

U.S. PATENT DOCUMENTS

| | | |
|---|---|---|
| 2017/0169800 A1 | 6/2017 | Greco et al. |
| 2019/0028287 A1 | 1/2019 | Jin et al. |

\* cited by examiner

DYNAMIC OBJECT UPDATE SUBSCRIPTIONS BASED ON USER INTERACTIONS WITH AN INTERFACE

CROSS-REFERENCE TO RELATED APPLICATIONS

This patent application is a continuation of U.S. application Ser. No. 16/176,851, filed Oct. 31, 2018, which claims priority from U.S. Provisional Appl. Ser. No. 62/729,180, filed Sep. 10, 2018, both of which are incorporated herein by reference in their entirety.

BACKGROUND

Systems have been provided for disseminating published updates to objects among a plurality of client devices via an at least partially centralized messaging system.

Through applied effort, ingenuity, and innovation many deficiencies of such systems have been solved by developing solutions that are in accordance with the embodiments of the present invention, many examples of which are described in detail herein.

BRIEF SUMMARY

Maintaining dynamic topic subscriptions configured for managing content transmission for client devices may significantly decrease the amount of data transmitted over a network from a message distribution system (e.g., such as a group-based communication platform) to individual client devices. To maintain desired user functionality and real-time updates of topics (e.g., objects) of interest to a user of a particular client device, the subscriptions may be dynamically adjusted based on user interactions with an interface of the client device. For example, the client device may be configured to request subscriptions for object updates relating to objects currently visible within a client device interface.

Various embodiments are directed to a dynamic subscription management system for providing object updates to a client device. In certain embodiments, the dynamic subscription management system comprises: one or more memory storage areas for maintaining current object data for a plurality of objects; and one or more processors collectively configured to: receive subscription modification requests from each of one or more client devices; dynamically maintain subscription data for each of the one or more client devices based at least in part on subscription modification requests received from each of the one or more client devices, wherein the subscription data identifies subscribed objects of the plurality of objects for each of one or more client devices; determine whether a particular client device of the one or more client devices comprises current object data corresponding to each subscribed object reflected in subscription data for the particular client device; and upon determining that the particular client device does not comprise current object data corresponding to one or more subscribed objects reflected in the subscription data for the particular client device, transmit updates of the subscribed objects reflected in the subscription data in real-time to the particular client device via a communication connection.

In certain embodiments, the dynamic subscription management system is in communication with the particular client device via a websocket connection. Moreover, the subscription modification requests received from the particular client device may comprise version identifiers corresponding to objects stored at the particular client device, and determining whether the particular client device comprises current object data corresponding to each subscribed object reflected in the subscription data for the particular client device comprises determining whether the version identifiers reflected in the subscription modification requests for one or more objects correspond with version identifiers of current object data stored within the one or more memory storage areas. In various embodiments, dynamically maintaining subscription data for the particular client device comprises: receiving a subscription modification request embodied as a subscribe request from the particular client device, wherein the subscribe request identifies one or more new objects of the plurality of objects to add to the subscription data; and updating the subscription data for the particular client device to include the one or more new objects. In various embodiments, each of the plurality of objects has a corresponding object identifier; and updating the subscription data for the particular client device comprises concatenating object identifiers corresponding to each of the one or more new objects onto the subscription data for the particular client device.

In certain embodiments, dynamically maintaining subscription data for the particular client device comprises: receiving a subscription modification request embodied as an unsubscribe request from the particular client device, wherein the unsubscribe request identifies one or more particular objects of the plurality of objects to remove from the subscription data; and updating the subscription data for the particular client device to remove the one or more particular objects. Moreover, each of the plurality of objects may have a corresponding object identifier, and updating the subscription data for the particular client device may comprise removing object identifiers corresponding to each of the one or more particular objects from the subscription data for the particular client device. In various embodiments, dynamically maintaining subscription data for a particular client device further comprises: receiving a subscription modification request embodied as a subscribe request from the particular client device, wherein the subscribe request identifies one or more new objects of the plurality of objects to add to the subscription data; and updating the subscription data for the particular client device further comprises, after removing object identifiers corresponding to each of the one or more particular objects from the subscription data for the particular client device, concatenating object identifiers corresponding to each of the one or more new objects onto the subscription data for the particular client device. The subscription data may define a maximum number of objects reflected within the subscription data.

Certain embodiments are directed to a method for providing object updates to a client device. The method may comprise: receiving subscription modification requests from each of one or more client devices; dynamically maintaining subscription data for each of the one or more client devices based at least in part on subscription modification requests received from each of the one or more client devices, wherein the subscription data identifies subscribed objects of the plurality of objects for each of one or more client devices; determining whether a particular client device of the one or more client devices comprises current object data corresponding to each subscribed object reflected in subscription data for the particular client device; and upon determining that the particular client device does not comprise current object data corresponding to one or more subscribed objects reflected in the subscription data for the particular client device, transmitting updates of the subscribed objects reflected in the subscription data in real-time to the particular client device via a communication connection.

In certain embodiments, the subscription modification requests received from the particular client device comprise version identifiers corresponding to objects stored at the particular client device, and determining whether the particular client device comprises current object data corresponding to each subscribed object reflected in the subscription data for the particular client device comprises determining whether the version identifiers reflected in the subscription modification requests for one or more objects correspond with version identifiers of current object data stored within the one or more memory storage areas. Moreover, dynamically maintaining subscription data for the particular client device may comprise: receiving a subscription modification request embodied as a subscribe request from the particular client device, wherein the subscribe request identifies one or more new objects of the plurality of objects to add to the subscription data; and updating the subscription data for the particular client device to include the one or more new objects. In certain embodiments, each of the plurality of objects has a corresponding object identifier; and updating the subscription data for the particular client device comprises concatenating object identifiers corresponding to each of the one or more new objects onto the subscription data for the particular client device.

In various embodiments, dynamically maintaining subscription data for the particular client device comprises: receiving a subscription modification request embodied as an unsubscribe request from the particular client device, wherein the unsubscribe request identifies one or more particular objects of the plurality of objects to remove the subscription data; and updating the subscription data for the particular client device to remove the one or more particular objects. In certain embodiments, each of the plurality of objects has a corresponding object identifier; and updating the subscription data for the particular client device comprises removing object identifiers corresponding to each of the one or more particular objects from the subscription data for the particular client device. In various embodiments, dynamically maintaining subscription data for a particular client device further comprises: receiving a subscription modification request embodied as a subscribe request from the particular client device, wherein the subscribe request identifies one or more new objects of the plurality of objects to add to the subscription data; and updating the subscription data for the particular client device further comprises, after removing object identifiers corresponding to each of the one or more particular objects from the subscription data for the particular client device, concatenating object identifiers corresponding to each of the one or more new objects onto the subscription data for the particular client device.

Certain embodiments are directed to a computer program product for maintaining an object update data stream to a client device, the computer program product comprising at least one non-transitory computer-readable storage medium having computer-readable program code portions stored therein, the computer-readable program code portions comprising an executable portion configured to: receive subscription modification requests from each of one or more client devices; dynamically maintain object subscription data for each of the one or more client devices based at least in part on subscription modification requests received from each of the one or more client devices, wherein the subscription data identifies subscribed objects of the plurality of objects for each of one or more client devices; determine whether a particular client device of the one or more client devices comprises current object data corresponding to each subscribed object reflected in the subscription data for the particular client device; and upon determining that the particular client device does not comprise current object data corresponding to one or more subscribed objects reflected in the subscription data for the particular client device, transmit updates of the subscribed objects reflected in the subscription data in real-time to the particular client device via a communication connection.

In various embodiments, the subscription modification requests received from the particular client device comprise version identifiers corresponding to local copies of objects stored at the particular client device, and determining whether the particular client device comprises current object data corresponding to each subscribed object reflected in the subscription data for the particular client device comprises determining whether the version identifiers reflected in the subscription modification requests for one or more objects correspond with version identifiers of current object data stored within one or more memory storage areas. Moreover, dynamically maintaining subscription data for the particular client device comprises: receiving a subscription modification request embodied as a subscribe request from the particular client device, wherein the subscribe request identifies one or more new objects of the plurality of objects to add to the subscription data; and updating the subscription data for the particular client device to include the one or more new objects. In certain embodiments, each of the plurality of objects has a corresponding object identifier; and updating the subscription data for the particular client device comprises concatenating object identifiers corresponding to each of the one or more new objects onto the subscription data for the particular client device. Moreover, dynamically maintaining subscription data for the particular client device may comprise: receiving a subscription modification request embodied as an unsubscribe request from the particular client device, wherein the unsubscribe request identifies one or more particular objects of the plurality of objects to remove from the subscription data; and updating the subscription data for the particular client device to remove the one or more particular objects. In various embodiments, each of the plurality of objects has a corresponding object identifier; and updating the subscription data for the particular client device comprises removing object identifiers corresponding to each of the one or more particular objects from the subscription data for the particular client device. Moreover, dynamically maintaining subscription data for a particular client device further comprises: receiving a subscription modification request embodied as a subscribe request from the particular client device, wherein the subscribe request identifies one or more new objects of the plurality of objects to add to the subscription data; and updating the subscription data for the particular client device further comprises, after removing object identifiers corresponding to each of the one or more particular objects from the subscription data for the particular client device, concatenating object identifiers corresponding to each of the one or more new objects onto the subscription data for the particular client device.

Various embodiments are directed to a client device for dynamically maintaining object updates stored on the client device, the client device comprising: one or more memory storage areas for maintaining a local data store of object data for a plurality of objects; one or more processors collectively configured to: monitor user interaction with the plurality of objects; detect one or more trigger events indicating a change in user interaction with one or more particular objects of the plurality of objects; generate a subscription modification request for the one or more particular objects based at least in part on the detected one or more trigger events; and transmit the subscription modification request to a remote computing platform to request a modification of object data transmitted to the client device relating to the one or more particular objects.

In certain embodiments, the one or more trigger events comprise moving one or more objects between a visible portion and hidden portion of a graphical user interface. In various embodiments, the one or more trigger events comprise moving one or more objects across a boundary of a visible portion of a graphical user interface. Moreover, upon detecting movement of the one or more objects from a hidden portion to a visible portion of a graphical user interface, generating a subscription modification request may comprise generating subscribe request for the one or more objects to initiate a subscription relating to the one or more objects. Moreover, upon detecting movement of the one or more objects from a visible portion to a hidden portion of a graphical user interface, generating a subscription modification request may comprise generating an unsubscribe request for the one or more objects to terminate a subscription relating to the one or more objects.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
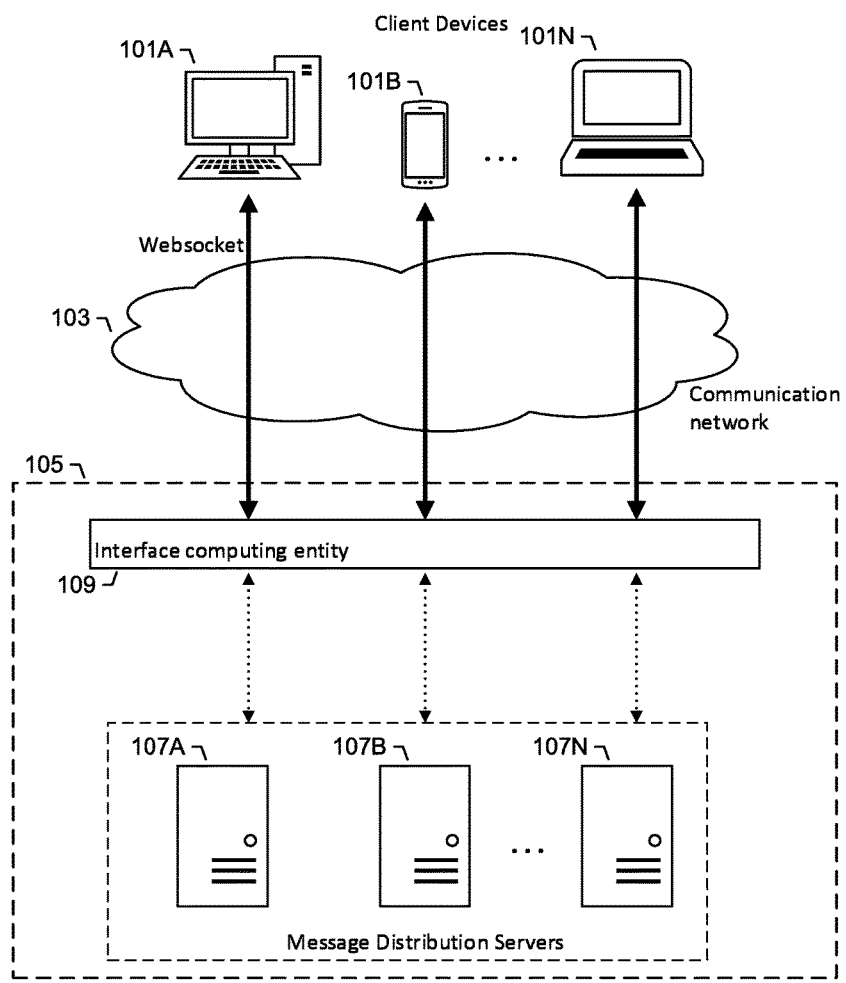
FIG. 1 shows a schematic view of a group-based communication platform in communication with client devices according to another embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

As the number of objects (e.g., users, files, topics, and/or the like) monitored by individual users of a group-based communication platform increases, the processing burdens placed on client devices used by those users increases, and the network traffic between the user's client device and the group-based communication platform increases to ensure that the user's client device receives all updates relating to the monitored objects. These technical problems are particularly acute in real-time messaging contexts, in which these object-based updates are disseminated to client devices in real-time, as the updates occur. In the most extreme cases in which a single user (and associated client device) monitors a large number of objects, object updates may be transmitted to the client device almost constantly.

In many cases, updates regarding objects that a user has little interest in following, and/or updates to objects that a user is not presently reviewing (e.g., objects represented in hidden or otherwise undisplayed portions of a user interface) may go entirely unnoticed by the user for a lengthy period of time. Pragmatically, individual users are unable to mentally comprehend a large number of object updates simultaneously, and accordingly some object updates may be demoted to a lower level of priority than other object updates.

Various embodiments utilize a dynamic subscription-based model to decrease the number of object updates that are relayed to a user at a given time. Only updates relating to objects to which a user is currently subscribed are transmitted to a client device, thereby decreasing the amount of network traffic flowing between the group-based communication platform and the client device. These subscriptions may be based on user interactions with the client device, and therefore the client device may be configured to generate subscription modification requests, such as subscribe requests and unsubscribe requests relating to various objects based on the occurrence of one or more trigger events at the client device. Those trigger events may be user-interaction-based, and may be considered proxies for a user's interest level in a particular object. For example, moving a particular object into a visible field of view of the user interface, for example, by moving an object across a boundary of the visible field of view of the user interface (e.g., scrolling until the object is visible) on the client device may be considered a trigger event utilized by the client device to generate and send a subscribe request for the object, and the corollary of moving an object out of a visible field of view of the user interface, for example, by moving an object across a boundary of the visible field of view of the user interface (e.g., scrolling until the object is no longer visible) may be considered a trigger event utilized by the client device to generate and send an unsubscribe request for the object. Other trigger events may be utilized as well, such that updates regarding background objects (e.g., objects not currently in a visible field of view) may be transmitted to the client device under appropriate circumstances. Those subscribe/unsubscribe requests may be generated and transmitted by the client devices in real-time to ensure that accurate and up-to-date object subscriptions are maintained at the group-based communication platform. By consequence, only object updates relating to objects currently deemed of interest to a particular user are transmitted to the user's client device at any given time.

Subscription data indicative of object subscriptions for individual client devices may be stored at the group-based communication platform (e.g., in a memory storage area accessible to one or more message distribution servers) and may be updated in real-time based on subscription modification requests received from the client devices. This stored subscription data may be used by the message distribution servers to filter the object updates to be transmitted to the client devices, such that only those updates relating to subscribed objects are transmitted to the client devices. As discussed in greater detail herein, the object updates may be transmitted through an interface computing entity located at the group-based communication platform.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "user" should be understood to refer to an individual, a group of individuals, business, organization, and the like. Users may access a group-based communication or messaging system using client devices. "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The terms "user profile," "user account," and "user account details" refer to information associated with a user, including, for example, a user identifier, one or more communication channel identifiers (e.g., group-based communication channel identifiers) associated with communication channels (e.g., group-based communication channels) that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a time zone, a status, and the like. The user account details can include a subset designation of user credentials, such as, for example, login information for the user including the user's username and password.

The term "client device" refers to computer hardware(s) and/or software(s) that is/are configured to access one or more services made available by one or more servers. The server(s) is/are often (but not always) on another computer system, in which case the client device accesses the service by way of a network. A client device may be associated with a group identification, where the group identification is an electronic indication that suggests a group (e.g., user group) that the user belongs to. Client devices may include, without limitation, smart phones, tablet computers, laptop computers, desktop computers, wearable devices, personal computers, enterprise computers, and the like.

The term "group-based communication platform" refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like.

The term "communication channel" refers to an information route and associated circuitry that is used for data exchange between and among systems and parts of systems. For example, a communication channel may be established between and among various client devices, allowing these client devices to communicate and share data between and among each other. These communication channels may be "group-based communication channels" established between and among a select group of client devices (and their respective users) for sharing messages among all users of the group. The communication channels may also and/or alternatively be one-to-one, direct message communication channels established between and among two client devices (and their respective users) for sharing messages among only those two users.

Multiple communication channels may operate on each of one or more computing devices, and therefore a communication channel identifier may be assigned to a communication channel, which indicates the physical address in a database where related data of that communication channel is stored and which is utilized to identify client devices that participate within the communication channel to receive data exchanged on the communication channel. The communication channel identifier therefore ensures communication channels remain distinct and separate even on computing devices associated with a plurality of communication channels.

A communication channel may be "public," which may allow any client device to join and participate in the information sharing through the communication channel. A communication channel may be "private," which may restrict data communications in the communication channel to certain client devices and/or users.

The term "group-based communication channel interface" refers to a virtual communications environment or feed that is configured to display messaging communications posted by channel members (e.g., validated users accessing the environment using client devices) that are viewable only to the members of the group. The format of the group-based communication channel interface may appear differently to different members of the group-based communication channel; however, the content of the group-based communication channel interface (i.e., messaging communications) will be displayed to each member of the group-based communication channel. For instance, a common set of group-based messaging communications will be displayed to each member of the respective group-based communication channel such that the content of the group-based communication channel interface (i.e., messaging communications) will not vary per member of the group-based communication channel.

In certain embodiments, portions of the group-based communication channel interface may be distinguished based on visibility. The group-based communication channel interface is characterized by a visible field of view surrounded by a visible field of view boundary comprising contents actually displayed. Other contents of the group-based communication channel interface may be hidden from view of the user. As a specific example, a long feed of content may be scrollable, such that only a portion of the long feed of content is displayed within the group-based communication channel interface at a given time. As the user scrolls through the feed of content, the visible portion changes in synchronization with the user's scrolling interaction with the group-based communication channel interface, and accordingly various objects move across the visible field of view boundary between the visible field of view and hidden portions of the group-based communication channel interface.

Figure 4:
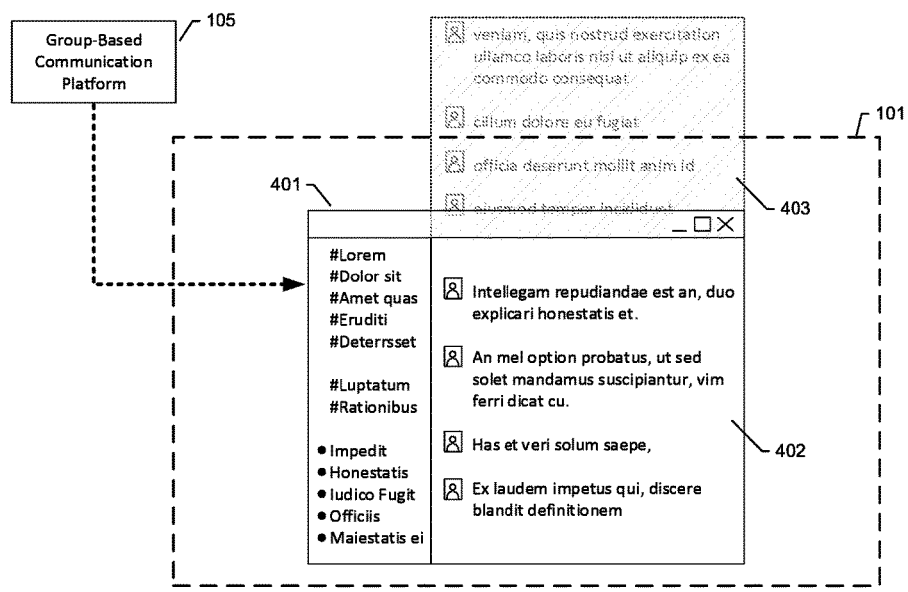
FIG. 4 shows a schematic view of data transmission interactions between display windows of a group-based communication interface, according to one embodiment.

In certain embodiments, the visible portion of the group-based communication channel interface may comprise multiple visible panes within a display window, as shown in FIG. 4, for example. In certain embodiments, each display pane may be configured to display specific data types. For example, a left-most pane may provide a listing of channels and/or direct messages available to a user and a right-most (or center pane, in a 3-pane configuration) may display the content of a particular channel in which messages are exchanged, including displaying all of those displayed messages. The content of the center pane may be presented as a scrollable feed such that the contents may be scrolled between not-visible portions of the pane (e.g., scrolled above or below the visible portion) and visible portions of the pane, in certain embodiments. In embodiments in which the main display window comprises 3-panes, the right-most pane may comprise additional data regarding a particular selected message, channel, and/or the like.

As used herein, the terms "messaging communication" and "message" refer to any electronically generated digital content object provided by a user using a client device and that is configured for display within a group-based communication channel interface. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a communication channel (e.g., a group-based communication channel) of the group-based communication system includes metadata comprising the following: a sending user identifier, a message identifier, message contents, an object identifier, a group identifier and/or a group-based communication channel identifier. Each of the foregoing identifiers may comprise ASCII text, a pointer, a memory address, and the like. Messages may be generated and/or edited within an individual pane of a group-based communication interface (a single pane being visible within a particular display window) and/or messages may be generated and/or edited within separate display windows (e.g., separate display windows may be utilized for generating postings to be shared within a communication channel and/or for initiating a call with other users).

The term "object" as used herein may refer to any content source for which updates may be provided and disseminated to one or more client devices. A particular user may be considered an object to other users, such that updates regarding the activities of the particular user may be disseminated to other client devices. Objects may also be embodied as files in certain embodiments, such that updates to those files may be disseminated to individual client devices. Updates relating to particular objects may be disseminated from the group-based communication platform (specifically, from a subscription management system in certain embodiments) to individual client devices as messages, which may comprise additional metadata identifying a particular object (referred to herein as an "object identifier") to which the updates relate. These object identifiers enable a client device to display the update in association with the appropriate object. In certain embodiments, the object identifiers comprise data indicative of the type of object to which the object relates (e.g., a user object, a file object, and/or the like) and may additionally or alternatively comprise data indicative of a unique string (e.g., a unique number, a unique alphanumeric string, and/or the like) that uniquely identifies the object (e.g., among all of objects or among all objects of a particular object type).

In certain embodiments, metadata associated with an object may additionally comprise "version identifiers" associated with the object, which are reflective of whether the object is current (up-to-date). The version identifier for an object may be an increasing numeric number, wherein the version identifier increases with each update of the object. However it should be understood that other configurations are possible (e.g., alphanumeric values, hashes, and/or the like).

The terms "group identifier" or "team identifier" refer to one or more items of data by which a group within a group-based communication system may be identified. For example, a group identifier may comprise ASCII text, a pointer, a memory address, and the like.

The terms "group-based communication channel identifier" or "channel identifier" refer to one or more items of data by which a group-based communication channel may be identified. For example, a group-based communication channel identifier may comprise ASCII text, a pointer, a memory address, and the like. In certain embodiments, a communication channel (whether public or private) may be available for use between users (and their associated client devices) of a common group/team, although cross-group communication channels may be available between client devices associated with users of separate teams. Thus, a channel identifier may be provided together with one or more group identifiers to specifically identify where data/messages related to the particular communication channel are stored.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more communication channels (e.g., group-based communication channels) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join and/or create communication channels (e.g., group-based communication channels). Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

"Interface computing entities" as discussed herein with reference to various embodiments are computing devices (or portions of computing devices) for maintaining communication connections with various client devices. Specifically, interface computing entities may be configured for maintaining websocket connections (or other communication connections) initiated by each of a plurality of client devices for transmitting messages (e.g., object updates) and corresponding metadata (e.g., comprising object identifiers) in real time between message distribution servers of the group-based communication platform and respective client devices.

"Message distribution servers" as discussed herein with reference to certain embodiments are computing devices configured for interacting with various client devices (e.g., via an interface computing entity) for receiving and/or disseminating object updates and/or other messages among client devices. Message distribution servers may be configured to receive, generate, store (in an associated database), and/or direct messages received from and/or disseminated to users (e.g., via corresponding client devices). The functionality of the message distribution servers may be provided via a single server or collection of servers having a common functionality, or the functionality of the message distribution servers may be segmented among a plurality of servers or collections of servers performing subsets of the described functionality of the message distribution servers. For example, a first subset of message distribution servers—gateway servers—may be configured for receiving messages from client devices and/or for transmitting messages to client devices via an interface computing entity. These gateway servers may be in communication with a second subset of message distribution servers—channel servers—configured for collecting messages distributed within communication channels and for storing those messages within a message repository database for indexing and archiving. In certain embodiments, the channel servers may be in communication with the interface computing entities to provide various messages to client devices.

In certain embodiments, message distribution servers may operate as, or in association with a "subscription management system" of the group-based communication platform that interacts with client devices (e.g., via the interface computing entities) for disseminating object updates among client devices both within and outside of the group-based communication platform based on "subscription data" associated with each client device identifying objects to which the client device subscribes. This subscription data may be embodied as a listing of subscribed objects for a particular client device, and objects may be added or removed from the object data, for example, by concatenating an object identifier or removing an object identifier from the subscription data. In certain embodiments, the interface computing entities generate and maintain backend connections with one or more message distribution servers as discussed herein for obtaining messages (e.g., object updates) to be disseminated to the various client devices, and the message distribution servers, through the functionality of a subscription management system, provides messages (e.g., object updates) relating to subscribed objects to the interface computing entities for distribution to appropriate client devices.

The subscription management system of certain embodiments is dynamic in nature, such that the subscription data for particular client devices may be updated (e.g., in real-time) based on one or more "subscription modification requests" received from corresponding client devices. These subscription modification requests may be embodied as "subscribe requests," in which the client device requests that a new object, not currently represented within the subscription data, is added to the subscription data such that further updates regarding the new object are transmitted to the client device; or "unsubscribe requests," in which the client device requests that an object is removed from the subscription data such that further updates regarding the object are not transmitted to the client device (e.g., until the object is again added to the subscription data as a new object).

In certain embodiments, one or more of the interface computing entities and/or the message distribution servers may be geographically distributed, for example, to service client devices located geographically proximate the one or more computing entities. However, in certain embodiments the various computing entities (including the interface computing entities and/or the message distribution servers) may be centrally-located.

Example System Architecture

Methods, apparatuses, and computer program products of the present invention may be embodied by any of a variety of devices. For example, the method, apparatus, and computer program product of an example embodiment may be embodied by a network device, such as a server or other network entity, configured to communicate with one or more devices, such as one or more client devices. In some preferred and non-limiting embodiments, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates example computing systems within which embodiments of the present invention may operate. Users may access a group-based communication platform 105 via a communication network 103 using client devices 101A-101N.

Communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 103 may include a cellular telephone, an 802.11, 802.16, 802.20, and/or WiMax network. Further, the communication network 103 may include a public network, such as the Internet, a private network, such as an intranet, or combinations thereof, and may utilize a variety of networking protocols now available or later developed including, but not limited to TCP/IP based networking protocols. As discussed herein, the networking protocol is configured to enable data transmission via websocket communications. For instance, the networking protocol may be customized to suit the needs of the group-based communication system. In some embodiments, the protocol is a custom protocol of JSON objects sent via a websocket channel. In some embodiments, data may be transmitted via a plurality of protocols, such as JSON over RPC, JSON over REST/HTTP, and the like.

In the illustrated embodiment, the group-based communication platform 105 includes a plurality of message distribution servers 107A-107N accessible via the communication network 103 via an interface computing entity 109. Collectively, the message distribution servers 107A-107N are configured for receiving messages transmitted from one or more client devices 101A-101N, generating and/or receiving messages indicative of object updates (if applicable), for transmitting messages to appropriate client devices 101A-101N via an interface computing entity 109, and/or the like.

Similarly, the interface computing entity 109 (or plurality of interface computing entities 109) may be embodied as a computer or computers as known in the art. In the illustrated embodiment of FIG. 1, the interface computing entity 109 provides for receiving electronic data from various sources, including, but not limited to the client devices 101A-101N (e.g., via websocket communications over the communications network 103) and/or the message distribution servers 107A-107N (e.g., via backend communications). Moreover, the interface computing entity 109 of the illustrated embodiment is also configured to parse metadata provided as a portion of one or more electronic messages, and to direct incoming electronic messages to one or more message distribution servers 107A-107N based at least in part on the content of the metadata associated with the electronic messages and/or to direct outbound electronic messages to one or more client devices 101A-101N based at least in part on the content of the metadata associated with the electronic messages.

The client devices 101A-101N may be any computing device as defined above. Electronic message data exchanged between the message distribution servers 107A-107N and the client devices 101A-101N via the interface computing entity 109 may be provided in various forms and via various methods.

In some preferred and non-limiting embodiments, one or more of the client devices 101A-101N are mobile devices, such as smartphones or tablets. The one or more client devices may execute an "app" to interact with the message distribution servers 107A-107N and/or interface computing entity 109. Such apps are typically designed to execute on mobile devices, such as smartphones or tablets. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another, and with particular hardware and software components of mobile devices. For example, the mobile operating systems named above each provides frameworks for interacting with location services circuitry, wired and wireless network interfaces, user contacts, and other applications. Communication with hardware and software modules executing outside of the app is typically provided via application programming interfaces (APIs) provided by the mobile device operating system. Thus, via the app executing on the client devices 101A-101N, these client devices 101A-101N are configured for communicating with the group-based communication platform 105 via one or more websockets.

In some preferred and non-limiting embodiments, the client devices 101A-101N may interact with the message distribution servers 107A-107N and/or interface computing entity 109 via a web browser. The client devices 101A-101N may also include various hardware or firmware designed to interact with the message distribution servers 107A-107N and/or interface computing entity 109. Again, via the browser of the client devices 101A-101N, the client devices 101A-101N are configured for communicating with the group-based communication platform 105 via one or more websockets.

In some embodiments of an exemplary group-based communication platform 105, a message or messaging communication may be sent from a client device 101A-101N to a group-based communication platform 105. In various implementations, messages may be sent to the group-based communication platform 105 over communication network 103 directly by one of the client devices 101A-101N. The messages may be sent to the group-based communication platform 105 via an intermediary such as a message server, and/or the like. For example, a client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
```

```
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting invention. I have attached a copy our patent
policy.</contents>
        <attachments>patent_policy.pdf</attachments>
    </message>
</auth_request>
```

In the illustrated embodiment, the group-based communication platform 105 comprises a plurality of message distribution servers 107A-107N configured to receive and/or disseminate messages transmitted between and/or to a plurality of client devices 101A-101N within a channel identified by a channel identifier and/or a group identifier, and to facilitate dissemination of those messages among client devices 101A-101N that collectively form the membership of the communication channel.

In some embodiments, an object identifier as defined above may be associated with the message to indicate that a particular message is embodied as an object update relating to a particular object.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel interface in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message, and these files may be separately identified as objects having a corresponding object identifier in certain embodiments. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) and/or to facilitate various facets of searching (i.e., search queries that return results from the message distribution servers 107). Metadata associated with the message may be determined and the message may be indexed in the message distribution servers 107A-107N. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). If there are attachments associated with the message, file contents of the associated files may be used to index such files in the message distribution servers 107A-107N to facilitate searching. In one embodiment, the files may be indexed such that a company's or a group's files are indexed at a separate distributed repository.

Examples of electronic information exchange among one or more client devices 101A-101N and the group-based communication platform 105 are described below with reference to FIG. 1.

As shown in FIG. 1, the group-based communication platform 105 enables individual client devices 101A-101N to exchange various messages with one another and/or to retrieve object updates disseminated from the group-based communication platform 105. To exchange such messages, individual client devices 101A-101N transmit messages (e.g., text-based messages, files, video and/or audio streams, and/or the like) to an interface (e.g., interface computing entity 109) via a communication protocol (e.g., via a web-socket, a non-RTM (non-Real Time Messaging) messaging protocol, and/or the like). Those messages are ultimately provided to one or more message distribution servers 107A-

107N, which indexes the messages and distributes those messages to the intended recipients (e.g., client devices 101A-101N) of the message. Object updates are similarly provided to the message distribution servers 107A-107N, however such object updates may not originate from client devices 101A-101N. Instead, object updates may be provided from one or more external systems (e.g., file management systems) or the object updates may be generated by one or more computing entities within the group-based communication platform 105. The distributed messages are provided to the recipient client devices 101A-101N via the interface computing entity 109, which maintains websocket connections with individual recipient client devices 101A-101N of the message, and maintains one or more backend connections with the various message distribution servers 107A-107N.

According to the embodiment of FIG. 1, the client devices 101A-101N are configured to display the received message in contextually-relevant user interfaces available to the user of the client device 101A-101N. For example, messages transmitted from a first client device 101 as a part of a group-based communication channel are displayed in a user interface display window on client devices 101A-101N associated with other members of the group-based communication channel. As discussed herein, messages indicative of particular object updates are transmitted with object identifiers usable by the recipient client devices 101A-101N to display those messages with appropriate context, such as appropriate user display elements and/or in association with applicable objects. Moreover, the object identifiers may be usable by various ones of the message distribution servers 107A-107N to filter messages destined for particular client devices 101A-101N based on object subscriptions as discussed herein.

To distribute messages to individual client devices 101A-101N, the messages are transmitted from the message distribution servers 107A-107N to the interface computing entity 109, which directs all messages destined for respective ones of the client devices 101A-101N, and transmits all of those messages to the client devices 101A-101N over appropriate connections (e.g., websocket connections).

Example Apparatuses Utilized with Various Embodiments

Figure 2:
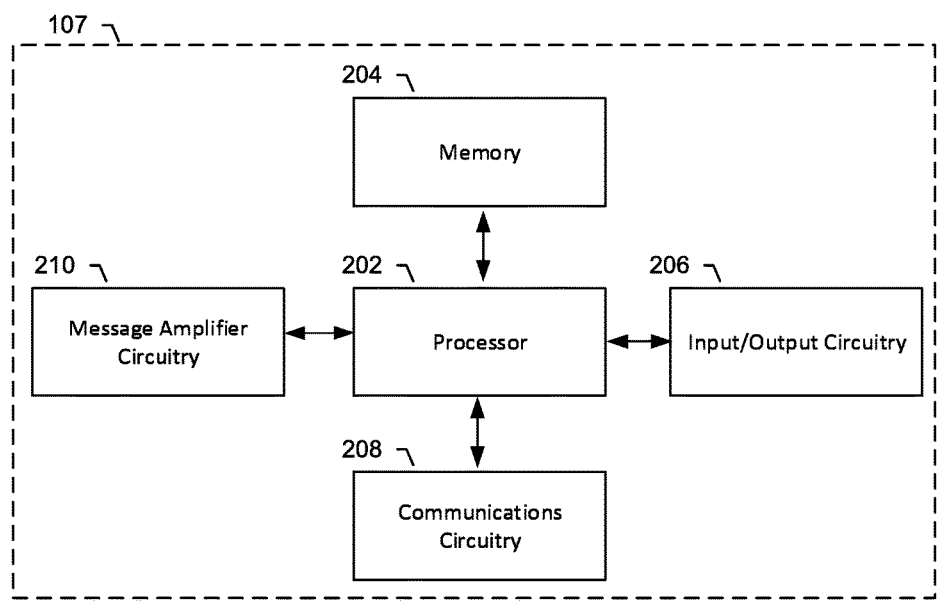
FIG. 2 shows a schematic view of a message distribution server according to one embodiment.

Each message distribution server 107 may be embodied by one or more computing systems, such as apparatus 200 shown in FIG. 2. The apparatus 200 may include processor 202, memory 204, input/output circuitry 206, communications circuitry 208, and message amplifier circuitry 210. The apparatus 200 may be configured to execute the operations described herein with respect to FIGS. 1-6. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 101A-101N to enable message sharing/dissemination therebetween. The processor 202 ensures that messages intended for exchange between the client devices 101A-101N within the particular communication channel are properly disseminated to those client devices 101A-101N for display within respective display windows provided via the client devices 101A-101N.

Moreover, the processor 202 may be configured to synchronize messages exchanged on a particular communication channel with a database for storage and/or indexing of messages therein. In certain embodiments, the processor 202 may provide stored and/or indexed messages to the interface computing entity 109 for dissemination to client devices 101A-101N.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

Message amplifier circuitry 210 includes hardware configured to copy and amplify electronic messages and associated metadata received from one or more client devices 101A-101N to other client devices 101A-101N based on database shard(s). The message amplifier circuitry 210 may utilize processing circuitry, such as the processor 202, to perform these actions. However, it should also be appreciated that, in some embodiments, the message amplifier circuitry 210 may include a separate processor, specially configured Field Programmable Gate Array (FPGA), or Application Specific Integrated Circuit (ASIC) for performing the functions described herein. The message amplifier circuitry 210 may be implemented using hardware components of the apparatus configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 3:
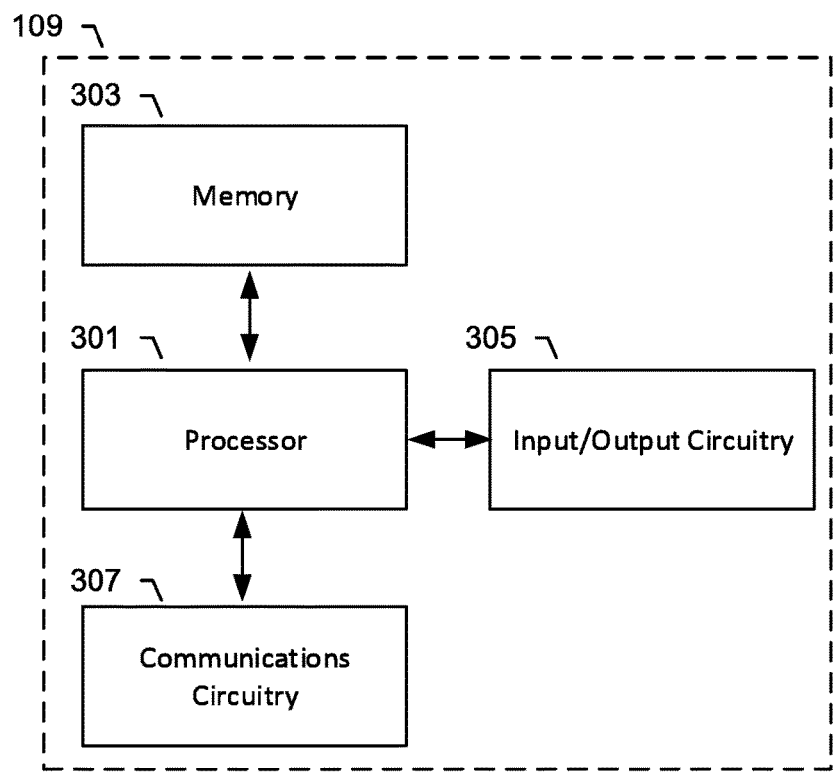
FIG. 3 shows a schematic view of an interface computing entity according to one embodiment.

In the illustrated embodiment of FIG. 3, the interface computing entity 109 is embodied by one or more computing systems encompassing apparatus 300. The illustrated apparatus 300 includes processor 301, memory 303, input/output circuitry 305, and communications circuitry 307. The apparatus 300 may be configured to execute the operations described herein with respect to FIGS. 1-6. Although these components 301-307 are described with respect to functional limitations, it should be understood that the particular implementations necessarily include the use of particular hardware. It should also be understood that certain of these components 301-307 may include similar or common hardware. For example, two sets of circuitries may both leverage use of the same processor, network interface, storage medium, or the like to perform their associated functions, such that duplicate hardware is not required for each set of circuitries.

In some embodiments, the processor 301 (and/or co-processor or any other processing circuitry assisting or otherwise associated with the processor) may be in communication with the memory 303 via a bus for passing information among components of the apparatus. The memory 303 is non-transitory and may include, for example, one or more volatile and/or non-volatile memories. In other words, for example, the memory 303 may be an electronic storage device (e.g., a computer-readable storage medium). The memory 303 may be configured to store information, data, content, applications, instructions, or the like for enabling the apparatus 300 to carry out various functions in accordance with example embodiments of the present invention. For example, the memory 303 may be configured to cache messages exchanged on one or more group-based communication channels, such that the processor 301 may provide various messages to client devices (e.g., on an as needed or as requested basis).

The processor 301 may be embodied in a number of different ways and may, for example, include one or more processing devices configured to perform independently. In some preferred and non-limiting embodiments, the processor 301 may include one or more processors configured in tandem via a bus to enable independent execution of instructions, pipelining, and/or multithreading.

In some preferred and non-limiting embodiments, the processor 301 may be configured to execute instructions stored in the memory 303 or otherwise accessible to the processor 301. In some preferred and non-limiting embodiments, the processor 301 may be configured to execute hard-coded functionalities. As such, whether configured by hardware or software methods, or by a combination thereof, the processor 301 may represent an entity (e.g., physically embodied in circuitry) capable of performing operations according to an embodiment of the present invention while configured accordingly. Alternatively, as another example, when the processor 301 is embodied as an executor of software instructions, the instructions may specifically configure the processor 301 to perform the algorithms and/or operations described herein when the instructions are executed.

In some embodiments, the apparatus 300 may include input/output circuitry 305 that may, in turn, be in communication with processor 301 to provide output to the user and, in some embodiments, to receive an indication of a user input. The input/output circuitry 305 may comprise a user interface and may include a display, and may comprise a web user interface, a mobile application, a client device, a kiosk, or the like. In some embodiments, the input/output circuitry 305 may also include a keyboard, a mouse, a joystick, a touch screen, touch areas, soft keys, a microphone, a speaker, or other input/output mechanisms.

The communications circuitry 307 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 307 may include, for example, a network interface for enabling communications with a wired or wireless communication network. For example, the communications circuitry 307 may include one or more network interface cards, antennae, buses, switches, routers, modems, and supporting hardware and/or software, or any other device suitable for enabling communications via a network. Additionally or alternatively, the communications circuitry 307 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Moreover, although the interface computing entity 109 is shown within the bounds of the group-based communication platform 105, it should be understood that the interface computing entity 109 may be embodied as an edge-based computing device in communication with aspects of the group-based communication platform 105 via a communication network 103. Such embodiments may comprise a plurality of interface computing entities 109 that are geographically distributed, and such interface computing entities 109 may be configured for communicating with client devices 101A-101N within a geographic range proximate a respective interface computing entity 109.

The term "circuitry" should be understood broadly to include hardware and, in some embodiments, software for configuring the hardware. With respect to components of each apparatus 200, 300, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 300 may provide or supplement the functionality of particular circuitry. For example, the processor 301 may provide processing functionality, the memory 303 may provide storage functionality, the communications circuitry 307 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of a group-based communication platform may comprise one or more databases configured for storing and/or indexing messages exchanged within various group-based communication channels.

Example Data Flows

Figure 5:
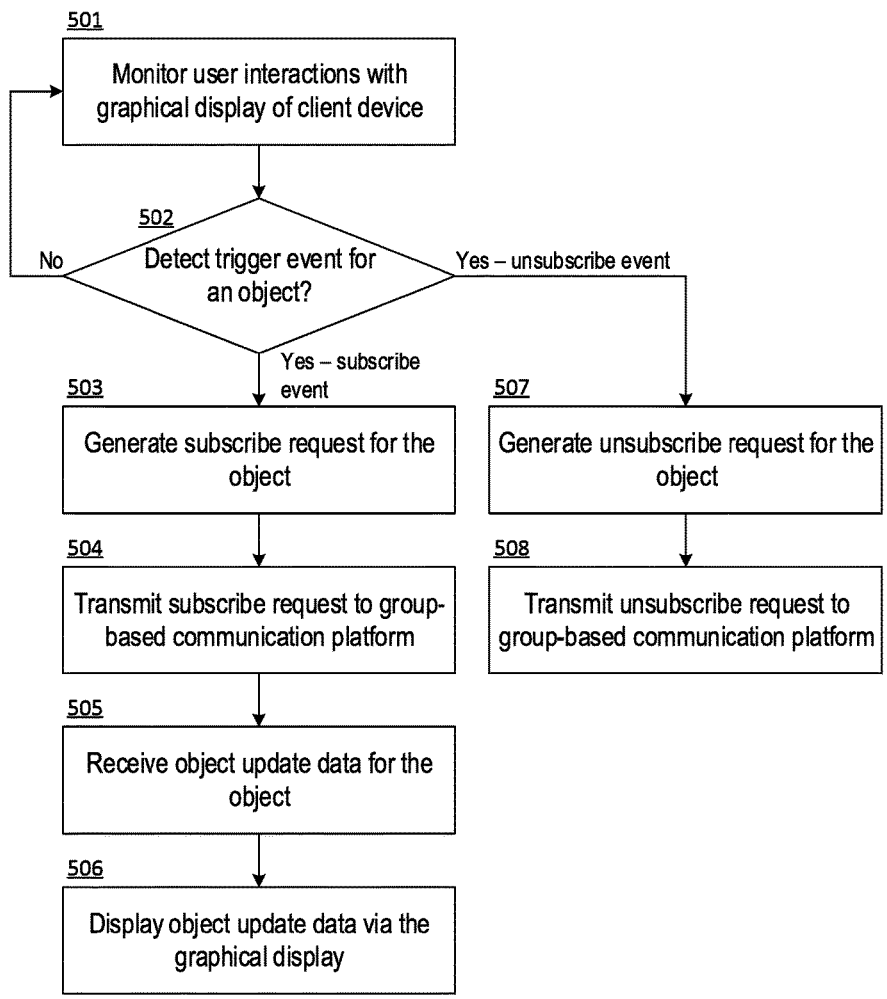
FIGS. 5-6 are flowcharts illustrating the functionality of various computing entities according to various embodiments.
Figure 6:
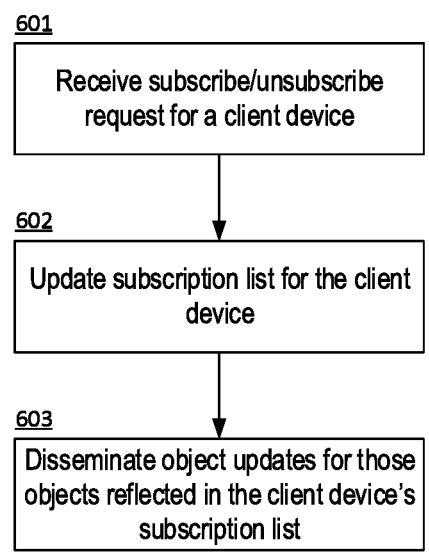

FIGS. 5-6 are flowcharts illustrating the functionality of the individual client devices 101A-101N and the group-based communication platform 105. As mentioned herein, various embodiments enable the group-based communication platform 105 to minimize the amount of network traffic transmitted to the client devices 101A-101N through the use of subscription-based data transmission schemes for object updates. These subscription-based data transmission schemes may operate based on user activity with a client device 101A-101N, such that the client device 101A-101N requests to subscribe to a particular object's updates upon determining that the particular object is currently being viewed by the user or is otherwise considered of current interest to the user. The client devices 101A-101N may utilize one or more trigger events to determine when to generate a subscribe request or an unsubscribe request.

Client Device Operation

According to various embodiments, the individual client devices 101A-101N determine the level of network traffic transmitted from the group-based communication platform 105 to those client devices 101A-101N for providing object updates thereto. The client devices 101A-101N rely on the detection of certain defined trigger events for determining which object updates should be transmitted from the group-based communication platform 105 to the individual client devices 101A-101N, and those client devices 101A-101N provide data to the group-based communication platform 105 in the form of subscription modification requests embodied as subscribe requests and unsubscribe requests to reflect the determined need of the client devices 101A-101N for object updates. The individual client devices 101A-101N are configured to constantly monitor usage by a user to determine which object update subscriptions may be terminated, and which object update subscriptions need to be initiated based on the user's interaction with a graphical interface of the client device 101A-101N.

FIG. 5 illustrates various steps performed by an example client device 101 for maintaining up-to-date object update subscriptions in real-time in connection with a group-based communication platform 105. As shown at Block 501, the client device 101 monitors user interactions with the client device 101 to detect whether a trigger event has occurred with respect to one or more objects, as indicated at Block 502.

The trigger events may be any of a variety of events indicating that the user of the client device 101 has an interest in the particular object. With reference briefly to the example interface schematic of FIG. 4, a trigger event may be scrolling a particular pane within the interface such that an indication of an object moves across a boundary of a visible portion of a user interface from a hidden portion 403 (e.g., outside of the field of view of the interface) to a visible portion 402 (e.g., within the field of view of the interface) to initiate a subscribe request, or vice-versa (movement from a visible portion 402 to a hidden portion 403) to initiate an unsubscribe request. As another example, a trigger event may be moving between one display to another (e.g., causing the client device to initiate a subscribe request for one or more objects within the newly selected display and causing the client device to initiate an unsubscribe request for one or more objects within the unselected display). Other trigger events, such as selecting a channel having one or more objects therein, selecting a consolidated listing of objects, receiving a specific data type at the client device (e.g., via a websocket connection, a RTM connection, and/or the like) and/or the like, are further examples of trigger events that may be utilized for initiating a subscription modification request.

With reference again to FIG. 5, upon detecting a trigger event for initiating a subscribe request, the client device 101 generates such a subscribe request as indicated at Block 503. Because these subscribe requests (as well as the unsubscribe requests discussed below) are generated upon detection of the occurrence of a trigger event, the client device 101 is configured to generate subscription modification requests dynamically, such that the message distribution servers 107A-107N maintain up-to-date subscription data comprising a subscription listing for the client device 101. Through the dynamic generation of subscription modification requests, the client device 101 ensures that only object updates relevant to particular objects of current interest to the client device 101 (and the client device's user) are transmitted to the client device 101. This minimizes the amount of object update data transmitted between the group-based communication platform 105 and the client device 101.

In certain embodiments, the subscribe request comprises a request identifier (which may be later utilized to match a response with the initial request), a subscribe type (e.g., which may indicate how the request/response are routed between the client device 101 and the message distribution servers 107A-107N; and/or which may indicate what type of object the subscribe request relates to), and a subscription map identifying the objects for which a subscription is requested and/or other characteristics of those objects (e.g., a version identifier/number). The subscription map may be provided in an array according to various embodiments. In certain embodiments, subscription requests are additive at the message distribution servers 107A-107N, and accordingly the subscription map may only include a listing of new objects for which a subscription is requested. The listing included within the subscription map is added to an existing listing at the message distribution servers 107A-107N as discussed herein. However, it should be understood that in certain embodiments, the subscription map may be exclusive, such that the subscription map overwrites an existing listing of objects subscribed to by the client device 101 upon receipt of the subscription request at the message distribution servers 107A-107N.

As indicated at Block 504, the constructed subscription request is transmitted to the group-based communication platform 105, where it is directed to the message distribution servers 107A-107N for storage and use. Although not shown in FIG. 5, the message distribution servers 107A-107N may transmit a separate response indicating whether the subscribe request was successful/unsuccessful, which may be received by the client device 101 prior to receiving any object updates. In such embodiments, the client device 101 may generate a new subscribe request in the event the response indicates the subscribe request was unsuccessful.

Once the subscribe request has successfully been accepted by the message distribution servers 107A-107N, the message distribution servers 107A-107N provide object updates to the client device 101 upon determining that object data stored within a local data storage area of the client device 101 is not current (e.g., upon determining that a version identifier of object data stored at the client device 101 and reflected in the subscription modification request does not match a current version identifier stored at the message distribution servers 107A-107N). The client device 101 receives and stores those object updates in the local data storage area as indicated at Block 505, and provides appropriate updates to the visual indicators of those objects displayed via the graphical display of the client device 101, as indicated at Block 506.

Referring back to Block 502, upon detecting an unsubscribe trigger event for an object (e.g., moving an object into a not-visible portion of a display), the client device 101 generates an unsubscribe request as indicated at Block 507. In certain embodiments, the unsubscribe request comprises a request identifier (which may be later utilized to match a response with the initial request), an unsubscribe type (e.g., which may indicate how the request/response are routed between the client device 101 and the message distribution servers 107A-107N; and/or which may indicate what type of object the unsubscribe request relates to), and a listing of objects for which the unsubscribe request relates. The listing of objects may be provided in an array, in certain embodiments. Once the unsubscribe request is assembled at the client device 101, the client device 101 transmits the unsubscribe request to the group-based communication platform 105 as indicated at Block 508, where it is ingested and provided to the message distribution servers 107A-107N.

In certain embodiments, unsubscribe requests are additive at the message distribution servers 107A-107N, and accordingly the listing of objects only includes a listing of new objects for which an unsubscribe request is provided. In certain embodiments, a default operation of the message distribution servers 107A-107N is an unsubscribed state for particular objects, and accordingly the unsubscribe request may cause the message distribution servers 107A-107N to remove the listed objects from a subscription list maintained at the message distribution servers 107A-107N for a particular client device 101.

In certain embodiments, disconnecting and/or reconnecting the client device 101 from the group-based communication platform 105 operates to unsubscribe the client device 101 from all subscriptions included within the client device's subscription list (e.g., with or without a discrete unsubscribe request transmitted from the client device 101). For example, upon reconnection of the client device 101 with the group-based communication platform 105 after a disconnection event, the client device 101 may generate and transmit an unsubscribe request for all of the previously established subscriptions existing prior to the disconnection event. As another example, upon reconnection of the client device 101 with the group-based communication platform 105, the message distribution servers 107A-107N may automatically unsubscribe the client device 101 from all of the previously established subscriptions existing prior to the disconnection event. This may operate to clean-up any extraneous subscriptions remaining within the client device's subscription list, such that only relevant subscriptions are renewed when the client device 101 reconnects with the group-based communication platform 105. Upon reconnection, the client device 101 generates subscription requests only for those objects for which a trigger event is detected (e.g., detecting that an object indicator is within a field-of-view of a display, and/or the like), as indicated according to the methodology described in relation to FIG. 5.

Message Distribution Server Operation

FIG. 6 provides an example set of steps performed by the message distribution servers 107A-107N with respect to subscription modification requests according to one embodiment. As indicated at Block 601, the message distribution servers 107A-107N receive subscription modification requests from one or more client devices 101A-101N. These requests may be received together with metadata indicative of the identity of a sending client device 101, such that the message distribution servers 107A-107N may appropriately update subscription lists for the sending client devices 101A-101N. Moreover, those subscription modification requests may comprise a request identifier (that may be used to correlate a response generated at the message distribution servers 107A-107N with the initial request generated at the client device 101), a request type (e.g., which may indicate, inter alia, whether the request is a subscribe or an unsubscribe request, and what type of object the request is directed to), and an array comprising a listing of objects for which the request relates. As a specific example, the request type may indicate that the request is a subscribe request for a file update, and the included array may comprise data identifying the particular file(s) for which the request relates. As yet another example, the request type may indicate that the request is an unsubscribe request for user updates, and the included array may comprise data identifying the particular user(s) for which the request relates. Because object updates are transmitted from the distribution servers 107A-107N together with one or more identifiers identifying the type of object to which the update relates and the identity of the object to which the update relates, the data contained within the request may be sufficient for the message distribution servers 107A-107N to apply a filter to object updates transmitted to the client devices 101A-101N.

As indicated at Block 602 of FIG. 6, the message distribution servers 107A-107N update a subscription list for the client device 101 based on the received subscription modification requests. As discussed above, the subscription lists stored at the message distribution servers 107A-107N for particular client devices 101A-101N are additive, such that updating a subscription list comprises adding non-duplicative objects for a client device's subscriptions to the client device-specific subscription list.

In certain embodiments, the message distribution servers 107A-107N may be configured to compare subscribe requests and unsubscribe requests received from a single client device 101 prior to updating the subscription list, such that combinations of subscribe requests and unsubscribe requests that would result in no net change to the subscription list may be cancelled out prior to updating the subscription list. As a specific example, if an existing subscription list indicates that the client device 101 is subscribed to Object A, the message distribution servers 107A-107N then receive both an unsubscribe request and a subscribe request relating to Object A, which would collectively result in a sequential unsubscription followed by a resubscription to Object A updates, the message distribution servers 107A-107N may cancel these requests out, because the net result of the unsubscribe and subscribe events is to maintain the status quo of the subscription with respect to Object A.

Moreover, in certain embodiments the message distribution servers 107A-107N may implement a maximum number of simultaneous subscriptions for a particular client device 101A-101N. Thus, when receiving at least substantially simultaneous subscribe and unsubscribe requests, the message distribution servers 107A-107N may be configured to update the subscription list based on the unsubscribe request prior to adding new subscriptions based on the subscribe request. Moreover, in such embodiments, the message distribution servers 107A-107N may be configured to reject subscribe requests that would result in the total number of subscriptions exceeding the maximum permissible number of subscriptions. In other embodiments, the message distribution servers 107A-107N may not reject subscribe requests that would cause the total number of subscriptions to exceed the maximum number of subscriptions, but may instead automatically unsubscribe the client device 101 from the oldest subscriptions within the subscription list such that the total number of subscriptions, including the newly requested subscriptions within the subscribe request, remains at or below the maximum number of subscriptions for the client device 101.

Based on the updated subscription lists, the message distribution servers 107A-107N disseminate object updates to client devices 101A-101N as indicated at Block 603. These object updates may be provided through the interface computing entity 109, which may be configured pass those object updates along to appropriate client devices 101A-101N. In certain embodiments, the message distribution servers 107A-107N may be further configured to ensure that all appropriate object updates are provided to a client device 101 to catch-up on object updates, for example, after reconnecting the client device 101 with the group-based communication platform 105 to recover from a disconnection.

Moreover, although not shown in FIG. 6, the message distribution servers 107A-107N may be configured to transmit messages to the client devices 101 indicating whether a subscription modification request was successful or unsuccessful. These responsive messages (which may be correlated with an original request based on the request identifier) may be transmitted separately from any object update data in certain embodiments. In other embodiments, the responsive messages may be added to (e.g., concatenated to) an object update message transmitted to the client device 101 to provide an indication to the client device 101 that the subscription modification request was successful.

In certain embodiments, the subscription modification requests generated at a client device 101 are specific to a particular connection mechanism utilized by the client device 101 to receive data from the group-based communication platform 105. For example, in embodiments in which the client device 101 receives data via one or more websocket connections with the group-based communication platform 105, subscription modification requests are generated at the client device 101 for each of the one or more websocket connections independently. Thus, in embodiments in which the client device 101 and the group-based communication platform 105 collectively maintain a plurality of websocket connections therebetween (e.g., supporting separate displays, channels, and/or the like), each websocket connection may have a corresponding subscription list maintained based on subscription modification requests transmitted from the client device 101 and processed by the message distribution servers 107A-107N.

Moreover, in certain embodiments the message distribution servers 107A-107N are configured to determine whether the destination client devices 101A-101N have already received one more messages, or whether the messages must still be transmitted to those destination client devices 101A-101N. Such functionality may be particularly relevant during reconnection between the client devices 101A-101N and the group-based communication platform 105 after a communication disconnect. In such instances, the message distribution servers 107A-107N may be configured to determine what messages (or other data) must be transmitted to the client devices 101A-101N such that the client devices 101A-101N have data indicative of up-to-date messages stored thereon. For example, the message distribution servers 107A-107N may compare data indicative of a last message provided to a particular client device 107A-107N for a particular object (e.g., data indicative of a version identifier of an object provided to the client device 101A-101N) relative to data indicative of all messages generated for a particular object (e.g., data indicative of a current version identifier for the particular object). The message distribution servers 107A-107N may then determine which messages (if any) should be provided to the client devices 101A-101N such that those client devices 101A-101N are fully caught-up on object updates for subscribed objects, such data indicative of those subscribed objects are fully current as stored on the client device 101A-101N.

Interface Computing Entity Operation

Generally, the interface computing entity 109 is configured to relay messages, object updates, and/or the like between the client devices 101A-101N and the message distribution servers 107A-107N. As messages are received from the message distribution servers 107A-107N to be disseminated to client devices 101A-101N, the interface computing entity 109 is configured to identify appropriate websocket connections with the destination client devices 101A-101N, and to pass those messages along to the appropriate client devices 101A-101N. In certain embodiments, messages (object updates) received at the interface computing entity 109 with assigned destination client devices 101A-101N have already been filtered according to the subscription methodologies discussed herein, and accordingly the interface computing entity 109 need not determine whether a particular client device 101 has subscribed to object updates received at the interface computing entity 109. Moreover, the interface computing entity 109 need not determine whether a particular client device 101 has already received a message destined for the particular client device 101. In such embodiments, the interface computing entity 109 operates merely to pass messages between the message distribution servers 107A-107N and the client devices 101A-101N.

As discussed herein, the interface computing entity 109 may be configured to maintain one or more websocket connections (or other data transmission connections) with each of the client devices 101A-101N. Similarly, the interface computing entity 109 is configured to maintain one or more backend connections with the message distribution servers 107A-107N, thereby enabling object updates and/or other messages to be passed between the client devices 101A-101N and the message distribution servers 107A-107N.

Moreover, it should be understood that in certain embodiments, one or more functionalities discussed herein with reference to the message distribution servers 107A-107N may be performed by the interface computing entity 109. For example, an interface computing entity 109 of certain embodiments may maintain subscription data for one or more client devices 101A-101N, and/or the interface computing entity 109 may determine whether object-related data stored at a client device 101A-101N for a subscribed object is fully current. Thus, it should be understood that the identity of the computing entity discussed herein as performing various functions of the group-based communication platform 105 need not be limiting in certain configurations.

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A dynamic subscription management system for providing object updates to a client device, the dynamic subscription management system comprising:
one or more memory storage areas for maintaining current object data for a plurality of objects;
one or more processors collectively configured to:
receive subscription modification requests from each of one or more client devices, wherein the subscription modification requests each comprise data identifying objects moved across a graphical user interface field of view border of a corresponding one of the one or more client devices;
dynamically maintain subscription data for each of the one or more client devices based at least in part on subscription modification requests received from each of the one or more client devices, wherein the subscription data identifies visible objects of the plurality of objects within the graphical user interface field of view of each of one or more client devices;
determine whether a particular client device of the one or more client devices comprises current object data corresponding to each visible object reflected in subscription data for the particular client device; and
upon determining that the particular client device does not comprise current object data corresponding to one or more visible objects reflected in the subscription data for the particular client device, transmit updates of the visible objects reflected in the subscription data in real-time to the particular client device via a communication connection.

2. The dynamic subscription management system of claim 1, wherein the dynamic subscription management system is in communication with the particular client device via a websocket connection.

3. The dynamic subscription management system of claim 1, wherein the subscription modification requests received from the particular client device comprise version identifiers corresponding to objects stored at the particular client device, and
determining whether the particular client device comprises current object data corresponding to each visible object reflected in the subscription data for the particular client device comprises determining whether the version identifiers reflected in the subscription modification requests for one or more objects correspond with version identifiers of current object data stored within the one or more memory storage areas.

4. The dynamic subscription management system of claim 1, wherein dynamically maintaining subscription data for the particular client device comprises:
receiving a subscription modification request embodied as a subscribe request from the particular client device, wherein the subscribe request identifies one or more new objects of the plurality of objects to add to the subscription data; and
updating the subscription data for the particular client device to include the one or more new objects.

5. The dynamic subscription management system of claim 4, wherein each of the plurality of objects has a corresponding object identifier; and
updating the subscription data for the particular client device comprises concatenating object identifiers corresponding to each of the one or more new objects onto the subscription data for the particular client device.

6. The dynamic subscription management system of claim 1, wherein dynamically maintaining subscription data for the particular client device comprises:
receiving a subscription modification request embodied as an unsubscribe request from the particular client device, wherein the unsubscribe request identifies one or more particular objects of the plurality of objects to remove from the subscription data; and
updating the subscription data for the particular client device to remove the one or more particular objects.

7. The dynamic subscription management system of claim 6, wherein each of the plurality of objects has a corresponding object identifier; and updating the subscription data for the particular client device comprises removing object identifiers corresponding to each of the one or more particular objects from the subscription data for the particular client device.

8. The dynamic subscription management system of claim 7, wherein dynamically maintaining subscription data for a particular client device further comprises:

receiving a subscription modification request embodied as a subscribe request from the particular client device, wherein the subscribe request identifies one or more new objects of the plurality of objects to add to the subscription data; and updating the subscription data for the particular client device further comprises, after removing object identifiers corresponding to each of the one or more particular objects from the subscription data for the particular client device, concatenating object identifiers corresponding to each of the one or more new objects onto the subscription data for the particular client device.

9. The dynamic subscription management system of claim 8, wherein the subscription data defines a maximum number of objects reflected within the subscription data.

10. The dynamic subscription management system of claim 1, wherein maintaining current object data for a plurality of objects comprises:

receiving object update data relating to one or more of the plurality of objects, wherein the object update data is generated at one or more client devices;

updating the object data stored within the one or more memory storage areas corresponding to the one or more of the plurality of objects based at least in part on the object update data.

11. A computer program product for maintaining an object update data stream to a client device, the computer program product comprising at least one non-transitory computer-readable storage medium having computer-readable program code portions stored therein, the computer-readable program code portions comprising an executable portion configured to:

receive subscription modification requests from each of one or more client devices, wherein the subscription modification requests each comprise data identifying objects moved across a graphical user interface field of view border of a corresponding one of the one or more client devices;

dynamically maintain object subscription data for each of the one or more client devices based at least in part on subscription modification requests received from each of the one or more client devices, wherein the subscription data identifies visible objects of the plurality of objects within the graphical user interface field of view of each of one or more client devices;

determine whether a particular client device of the one or more client devices comprises current object data corresponding to each visible object reflected in the subscription data for the particular client device; and upon determining that the particular client device does not comprise current object data corresponding to one or more visible objects reflected in the subscription data for the particular client device, transmit updates of the visible objects reflected in the subscription data in real-time to the particular client device via a communication connection.

12. The computer-program product of claim 11, wherein the subscription modification requests received from the particular client device comprise version identifiers corresponding to local copies of objects stored at the particular client device, and determining whether the particular client device comprises current object data corresponding to each visible object reflected in the subscription data for the particular client device comprises determining whether the version identifiers reflected in the subscription modification requests for one or more objects correspond with version identifiers of current object data stored within one or more memory storage areas.

13. The computer-program product of claim 11, wherein dynamically maintaining subscription data for the particular client device comprises:

receiving a subscription modification request embodied as a subscribe request from the particular client device, wherein the subscribe request identifies one or more new objects of the plurality of objects to add to the subscription data; and updating the subscription data for the particular client device to include the one or more new objects.

14. The computer-program product of claim 13, wherein each of the plurality of objects has a corresponding object identifier; and updating the subscription data for the particular client device comprises concatenating object identifiers corresponding to each of the one or more new objects onto the subscription data for the particular client device.

15. The computer-program product of claim 11, wherein dynamically maintaining subscription data for the particular client device comprises:

receiving a subscription modification request embodied as an unsubscribe request from the particular client device, wherein the unsubscribe request identifies one or more particular objects of the plurality of objects to remove from the subscription data; and updating the subscription data for the particular client device to remove the one or more particular objects.

16. The computer-program product of claim 15, wherein each of the plurality of objects has a corresponding object identifier; and updating the subscription data for the particular client device comprises removing object identifiers corresponding to each of the one or more particular objects from the subscription data for the particular client device.

17. The computer-program product of claim 16, wherein dynamically maintaining subscription data for a particular client device further comprises:

receiving a subscription modification request embodied as a subscribe request from the particular client device, wherein the subscribe request identifies one or more new objects of the plurality of objects to add to the subscription data; and updating the subscription data for the particular client device further comprises, after removing object identifiers corresponding to each of the one or more particular objects from the subscription data for the particular client device, concatenating object identifiers corresponding to each of the one or more new objects onto the subscription data for the particular client device.

18. The computer-program product of claim 11, wherein maintaining current object data for a plurality of objects comprises:
- receiving object update data relating to one or more of the plurality of objects, wherein the object update data is generated at one or more client devices;
- updating the object data stored within the one or more memory storage areas corresponding to the one or more of the plurality of objects based at least in part on the object update data.

19. A dynamic subscription management system for providing object updates to a client device, the dynamic subscription management system comprising:
- one or more memory storage areas for maintaining current object data for a plurality of objects;
- one or more processors collectively configured to:
  - receive subscription modification requests from each of one or more client devices, wherein the subscription modification requests each comprise data identifying changes to identified objects displayed within a graphical user interface field of view of a corresponding one of the one or more client devices;
  - dynamically maintain subscription data for each of the one or more client devices based at least in part on subscription modification requests received from each of the one or more client devices, wherein the subscription data identifies visible objects of the plurality of objects within the graphical user interface field of view of each of one or more client devices;
  - determine whether a particular client device of the one or more client devices comprises current object data corresponding to each visible object reflected in subscription data for the particular client device; and
  - upon determining that the particular client device does not comprise current object data corresponding to one or more visible objects reflected in the subscription data for the particular client device, transmit updates of the visible objects reflected in the subscription data in real-time to the particular client device via a communication connection.

20. The dynamic subscription management system of claim 19, wherein at least one of the subscription modification requests received from the particular client device identifies a plurality of new objects of the plurality of objects, wherein the plurality of new objects are added to the graphical user interface field of view of the particular client device.

21. The dynamic subscription management system of claim 20, wherein the plurality of new objects are identified upon switching between a plurality of channel interfaces accessible to the client device.

22. The dynamic subscription management system of claim 19, wherein the subscription modification requests received from the particular client device comprise version identifiers corresponding to objects stored at the particular client device, and
- determining whether the particular client device comprises current object data corresponding to each visible object reflected in the subscription data for the particular client device comprises determining whether the version identifiers reflected in the subscription modification requests for one or more objects correspond with version identifiers of current object data stored within the one or more memory storage areas.

23. The dynamic subscription management system of claim 19, wherein dynamically maintaining subscription data for the particular client device comprises:
- receiving a subscription modification request embodied as a subscribe request from the particular client device, wherein the subscribe request identifies one or more new objects of the plurality of objects to add to the subscription data; and
- updating the subscription data for the particular client device to include the one or more new objects.

24. The dynamic subscription management system of claim 22, wherein each of the plurality of objects has a corresponding object identifier; and
- updating the subscription data for the particular client device comprises concatenating object identifiers corresponding to each of the one or more new objects onto the subscription data for the particular client device.

25. The dynamic subscription management system of claim 19, wherein dynamically maintaining subscription data for the particular client device comprises:
- receiving a subscription modification request embodied as an unsubscribe request from the particular client device, wherein the unsubscribe request identifies one or more particular objects of the plurality of objects to remove from the subscription data; and
- updating the subscription data for the particular client device to remove the one or more particular objects.

26. The dynamic subscription management system of claim 24, wherein each of the plurality of objects has a corresponding object identifier; and
- updating the subscription data for the particular client device comprises removing object identifiers corresponding to each of the one or more particular objects from the subscription data for the particular client device.

27. The dynamic subscription management system of claim 25, wherein dynamically maintaining subscription data for a particular client device further comprises:
- receiving a subscription modification request embodied as a subscribe request from the particular client device, wherein the subscribe request identifies one or more new objects of the plurality of objects to add to the subscription data; and
- updating the subscription data for the particular client device further comprises, after removing object identifiers corresponding to each of the one or more particular objects from the subscription data for the particular client device, concatenating object identifiers corresponding to each of the one or more new objects onto the subscription data for the particular client device.

28. The dynamic subscription management system of claim 19, wherein maintaining current object data for a plurality of objects comprises:
- receiving object update data relating to one or more of the plurality of objects, wherein the object update data is generated at one or more client devices;
- updating the object data stored within the one or more memory storage areas corresponding to the one or more of the plurality of objects based at least in part on the object update data.

29. A computer program product for maintaining an object update data stream to a client device, the computer program product comprising at least one non-transitory computer-readable storage medium having computer-readable program code portions stored therein, the computer-readable program code portions comprising an executable portion configured to:
- receive subscription modification requests from each of one or more client devices, wherein the subscription modification requests each comprise data identifying changes to identified objects displayed within a graphical user interface field of view of a corresponding one of the one or more client devices;
- dynamically maintain object subscription data for each of the one or more client devices based at least in part on subscription modification requests received from each of the one or more client devices, wherein the subscription data identifies visible objects of the plurality of objects within the graphical user interface field of view of each of one or more client devices;
- determine whether a particular client device of the one or more client devices comprises current object data corresponding to each visible object reflected in the subscription data for the particular client device; and
- upon determining that the particular client device does not comprise current object data corresponding to one or more visible objects reflected in the subscription data for the particular client device, transmit updates of the visible objects reflected in the subscription data in real-time to the particular client device via a communication connection.

* * * * *